United States Patent
Patel

(10) Patent No.: US 10,982,099 B2
(45) Date of Patent: Apr. 20, 2021

(54) RESIN FORMULATION CONTAINING CURE SPEEDING INORGANIC PARTICULATE AND USE THEREOF AS A SURFACE MARKER

(71) Applicant: Illinois Tool Works Inc., Glenview, IL (US)

(72) Inventor: Naresh B. Patel, Bridgewater, NJ (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 216 days.

(21) Appl. No.: 16/151,464

(22) Filed: Oct. 4, 2018

(65) Prior Publication Data

US 2019/0106578 A1 Apr. 11, 2019

Related U.S. Application Data

(60) Provisional application No. 62/568,946, filed on Oct. 6, 2017.

(51) Int. Cl.

| | |
|---|---|
| *C09D 5/04* | (2006.01) |
| *C09D 167/00* | (2006.01) |
| *C09D 11/104* | (2014.01) |
| *C09D 167/03* | (2006.01) |
| *C09D 7/61* | (2018.01) |
| *C09D 7/20* | (2018.01) |
| *C09D 7/46* | (2018.01) |
| *C09D 7/41* | (2018.01) |
| *C08K 3/22* | (2006.01) |
| *C08K 3/34* | (2006.01) |
| *C08K 7/00* | (2006.01) |

(52) U.S. Cl.
CPC .......... *C09D 5/04* (2013.01); *C09D 7/20* (2018.01); *C09D 7/41* (2018.01); *C09D 7/46* (2018.01); *C09D 7/61* (2018.01); *C09D 11/104* (2013.01); *C09D 167/00* (2013.01); *C09D 167/03* (2013.01); *C08K 3/22* (2013.01); *C08K 3/34* (2013.01); *C08K 7/00* (2013.01); *C08K 2003/2241* (2013.01); *C08K 2201/003* (2013.01)

(58) Field of Classification Search
CPC ... C09D 5/04; C09D 7/61; C09D 7/20; C09D 7/46; C09D 7/41; C09D 11/104; C09D 167/00; C09D 167/03; C08K 3/22; C08K 3/34; C08K 7/00; C08K 2003/2241; C08K 2201/003
USPC ....................................................... 524/449
See application file for complete search history.

(56) References Cited

U.S. PATENT DOCUMENTS

| | | | |
|---|---|---|---|
| 3,351,611 A | 11/1967 | Conix | |
| 7,820,755 B2 | 10/2010 | Patel | |
| 2006/0030631 A1 | 2/2006 | Shah et al. | |
| 2015/0038620 A1* | 2/2015 | Lavalaye | C09D 17/006 |
| | | | 524/39 |

FOREIGN PATENT DOCUMENTS

| | | |
|---|---|---|
| DE | 102007034866 A1 | 1/2009 |
| JP | H05157706 A | 6/1993 |
| JP | 2947918 B2 | 9/1999 |
| WO | 03074281 A1 | 9/2003 |
| WO | 2009029095 A1 | 3/2009 |

OTHER PUBLICATIONS

Stoye et al., "5. Paint Additives," Paints, Coatings and Solvents, 2nd Ed., Wiley-VCH, pp. 159-171. (Year: 1998).*
Flick, E.W., "Engelhard Corp.: MEARLIN White Pearlescents", Plastics Additives: An Industrial Guide, 3rd Ed., vol. 2, Noyes Publications/William Andrews Publishing, pp. 96-97. (Year: 2002).*
Pfaff et al., Ch. 15 Pearlescent Pigments/Flakes, Coloring of Plastics: Fundamentals, 2nd Ed., John Wiley & Sons, p. 226. (Year: 2004).*
Ash et al, Industrial Chemical Thesaurus, 5th Ed., Synapse Information Resources, p. 3867. (Year: 2009).*
Christie, R.M., "9.5.4 Fluorescent Pigments," Ch. 9, Colour Chemistry, 2nd Ed, Royal Society of Chemistry, pp. 246-247. (Year: 2015).*
European Search Report dated Feb. 4, 2019 for European Application No. 18198822 filed Oct. 5, 2018.
European Search Report dated Mar. 29, 2018 for European Application No. EP 17200669 filed Nov. 8, 2017.

* cited by examiner

*Primary Examiner* — Josephine L Chang
(74) *Attorney, Agent, or Firm* — Blue Filament Law PLLC

(57) ABSTRACT

A surface marker resin formulation is provided that includes a linear aromatic polyester or a co-polymer thereof. The resin is dissolved or dispersed in a solvent exclusive of naphtha. An inorganic particulate having an average maximal linear extent of between 10 and 130 microns present from 22 to 41 total weight percent. A process of marking a surface includes two articles being brought into a preselected alignment to define a surface. A continuous bead is applied to the surface. The solvent evaporates to a state of dry-to-touch in a time of between less than 60 seconds to mark the surface. The formulation is readily applied from a pen to achieve a controlled bead width. The drying of the formulation by solvent evaporation yields full hardness in 24 hours under standard temperature and pressure as measured at 0% humidity.

18 Claims, No Drawings

RESIN FORMULATION CONTAINING CURE SPEEDING INORGANIC PARTICULATE AND USE THEREOF AS A SURFACE MARKER

RELATED APPLICATIONS

This application is a non-provisional application that claims priority benefit of U.S. Provisional Application Ser. No. 62/568,946 filed 6 Oct. 2017; the contents of which are hereby incorporated by reference.

FIELD OF THE INVENTION

The present invention in general relates to resin formulation and in particular, to resin formulation that dries under standard temperature and pressure to form a coating amenable for use as a marker with rapid drying induced by a filler compared to the prior art.

BACKGROUND OF THE INVENTION

Inspection paints are used in myriad applications to visually detect movement or tampering. Such paints are configured to adhere to, and form a breakable marking seal between, adjacent items that may undergo relative movement. For example, inspection paints may be applied to compression fittings, baseplates, studs, nuts, bolts, screws, fasteners, instrument and gauge housings and calibration mechanisms, parts and numerous other assemblies. Once dry, inspection paints become brittle and will crack if disturbed. Thus, when applied to adjacent items, inspection paints may be used to determine whether the two items have undergone relative movement. As a result, such pens are used extensively, in complex assembly and maintenance associated with aircraft, engines, and vehicles.

By way of example, inspection paints may be applied to the lug nuts attaching a vehicle wheel to an axle. Once the lug nuts are applied to the studs and properly torqued, inspection paint may be applied across the stud and the lug nut. Should the lug nut happen to loosen from the stud as a result of vibration or other means, the inspection paint marking will break, signaling that the lug nut has loosened. Similarly, an inspection paint may be applied to screws fastening the sealed chassis of an electronic device, such as a television. If the chassis is opened without authorization, the inspection paint marking will break, indicating a potential warranty tampering situation.

While state-of-the art current surface marker formulations sold under the tradename CROSS CHECK™ have numerous attractive attributes including drying to a hard film, compliance with BOEING® specification BMS8-45, adhesion to many substrates, and resistance to several common cleaning solvents. U.S. Pat. No. 7,820,755 is representative of such formulations. However, there are ever increasing demands that such markers dry ever quicker without compromising other attributes of the CROSS CHECK™ formulations. As a result, existing surface marker formulations likewise need to adjust to the requirements of ever quicker drying.

Thus, there exists a need for a surface marker formulation that dries to a hard film and does so on a time scale compatible with assembly and maintenance work flow at a rate that is accelerated by the filler.

SUMMARY OF THE INVENTION

A surface marker resin formulation is provided that includes a linear aromatic polyester or a co-polymer thereof. The resin is dissolved or dispersed in a solvent exclusive of naphtha. An inorganic particulate having an average maximal linear extent of between 10 and 130 microns present from 22 to 41 total weight percent.

A process of marking a surface includes two articles being brought into a pre-selected alignment to define a surface. A continuous bead is applied to the surface. The solvent evaporates to a state of dry-to-touch in a time of between 1 and 60 seconds to mark the surface. Often the surface is a torqued interface between the articles, as found on vehicles. The formulation is readily applied from a pen to achieve a controlled bead width. The drying of the formulation by solvent evaporation achieves a drying to hardness in 24 hours as measured under standard temperature and pressure and 0% relative humidity.

DETAILED DESCRIPTION OF THE INVENTION

The present invention has utility as surface marker formulation and a marker pen containing such a formulation that is able to afford tamper indicating markings to a variety of substrates associated with vehicles, including torque indication. In some inventive embodiments, an inventive formulation is dry to the touch in 60 seconds or less, as measured at standard temperature and pressure (STP). An inventive formulation accepts a variety of conventional pigment and dye packages to provide a spectrum of colors and levels of fluorescence. Through the exclusion of naphtha-based solvents and the inclusions of large amounts of inorganic oxide particulate relative to conventional marker formulations, a more rapid drying is obtained that is desirable in a variety of industrial applications.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive surface marker formulation is based on an inorganic particulate constituting the largest component by weight after drying of the formulation to a dry to touch resin film. The solvent dispersed resin dries on a target substrate to a desired film that retains a pigment or dye package on the substrate, the solvent being exclusive of naptha (CAS 64742-95-6).

The formulation in some inventive embodiments includes a pigment or a dye; and in certain invention embodiments, at least one of: an anti-skinning additive, a synthetic drier, a wetting additive, a gelled viscosity builder additive and a rheological additive.

As used herein, polymer molecular weight is weight average molecular weight (Mw), unless otherwise specified.

As used herein, maximal linear extent refers to the longest orthogonal axis of a particle. By way of example a spherical particle has identical maximal linear extent in all three orthogonal axes (X-Y-Z) and represents the particle diameter. While some particles, such as titanium dioxide are generally spherical, mica with a lamellar form has a sphericity of approximately 0.28 and has a pronounced anisotropy.

Inorganic particulate is present in a fully compound and solvated formulation from 22 to 41 total weight percent and has a particle number average, maximal linear extent of from 10 to 130 microns. In particular inventive embodiments, effective at rapid drying, the inorganic particulate is present from 35 to 41 total weight percent. In other inventive embodiments, the inorganic particulate has a particle number average, maximal linear extent of from 10 to 60 microns. Inorganic particulate operative in the present invention includes mica, titanium dioxide, aluminum oxide, fumed silica, magnesium oxide, calcium carbonate, magnesium silicate, or a combination thereof. In particular inventive embodiments, the inorganic particulate is a mixture of mica and titanium dioxide present in a weight ratio of 1.2-4:1.

In contrast to the prior art of U.S. Pat. No. 7,820,755 that is based on a polyurethane (urethane alkyd polymer) resin, the present invention invokes polyester resins that are linear aromatic polyesters, and co-polymers thereof, containing at least 40 monomer percent of aromatic polyester subunits. Linear aromatic polyester synthesis and structures are illustratively detailed in U.S. Pat. No. 3,351,611. In other inventive embodiments, the monomer percent of aromatic polyester subunits is between 50 and 90 percent. In still other inventive embodiments, a linear aromatic polyester is aliphatically saturated. It is appreciated that a linear aromatic polyester operative herein is either amorphous or crystalline. In still other inventive embodiments, the linear aromatic polyester has a glass transition temperature (Tg) of between 60° C. and 120° C., and in still other inventive embodiments, Tg of between 65° C. and 110° C. In still other inventive embodiments, the linear aromatic polyester has a hydroxyl number from 2 to 80 mg/g KOH/g. In still other inventive embodiments, the linear aromatic polyester has a molecular weight of between 9,000 g/mol and 108,000 g/mol.

Upon dispersion or dissolution of an inventive resin in a solvent along with a colorant package, an inventive formulation is amendable to provision to an end user in the form of a paint to be applied by brush or spray, as well as through inclusion with a marker tube. The construct of such a tube is conventional to the art, as sold under the brand name DYKEM® CROSS CHECK™. The resin is typically present from 16 to 37 total weight percent of a formulation and in specific inventive embodiments from 18 to 33 total weight percent. It has been found that solvent that is a mixture of ketones or esters exclusive of naphtha solvent such as Aromatic 100, 150, or 200 a provides for a marking that touch dries in less than 60 seconds.

A colorant operative in the present invention illustratively includes titanium dioxide particulate, carbon black, iron oxides, phthalocyanine blue, azo dyes, anthraquinone dyes, manganese, phosphors, and combinations thereof. These pigments and dyes are amenable to dissolution or suspension in the solvated linear aromatic resin. A pigment or dye is present from 0.2 to 20 total weight percent of a complete formulation for application to a substrate. It is appreciated that while a dye can be operative in amounts as lows as 0.2 total weight percent, particulate pigments require larger quantities to affect coloring. In certain inventive embodiments, the colorant is present from 0.5 to 8 total weight percent. It is appreciated that a colorant package in some embodiments includes solvents, surfactants, non-foaming agents, and other conventional additives to facilitate storage and dispersion. Fluorescent or phosphorescent pigments and dyes are preferred as being visible to the unaided normal human eye under a variety of lighting conditions. A variety of such pigments and dyes are available from the DAYGLO Corporation, Cleveland, Ohio, USA. These colors illustratively include pink, yellow, blue, orange, and green.

The linear aromatic polyester resins of the present invention are dissolved or at least dispersed in a solvent. A solvent suitable for dissolution or dispersion of an inventive resin illustratively include halogenated hydrocarbons such as methylene chloride, chloroform, 1,2-dichloroethane, tetrachloroethane, methylchloroform, 1,1,2-trichloroethane; $C_3$-$C_8$ ketones, such as methyl ethyl ketone, acetone, and diacetone alcohol; cyclic $C_3$-$C_6$ ethers; ($C_1$-$C_4$)—O—($C_1$-$C_4$) ethers; ethylene glycol ethers; diethylene glycol ethers; $C_2$-$C_{14}$ alkyl esters of $C_2$-$C_8$ carboxylic acids, and combinations any of the aforementioned that are miscible. Typically, solvent as a single component or mixture of miscible solvents is exclusive of naphtha and is present from 20 to 40 total weight percent of a complete formulation for application to a substrate. In contrast to prior art marking formulations in which resins constituted the largest single component by weight of a dried formulation as hard resin film containing colorant, according to the present invention, inorganic particulate is present as the largest single component of a hard resin film produced, and in certain inventive embodiments, second only to solvent in a fully solvated formulation prior to drying to a hard resin film.

A thixotropic agent operative in the present invention illustratively includes fumed silica, organoclays, inorganic clays and precipitated silica. Multifunctional alcohols are commonly used to enhance thixotropic properties. A thixotropic agent is present from 0-15 percent by weight. The thixotropic agent is present in specific embodiments from 0.5 to 8 total weight percent of a complete formulation for application to a substrate. To the extent a multifunctional alcohol used, it is typically present from 1 to 5 weight percent of the thixotropic agent.

A siccative additive is provided in some inventive embodiments to regulate the drying speed of the formulation. A siccative additive operative in the present invention illustratively includes a transition metal carboxylate for which medium- to long-chain linear or branched carboxylic acids—most commonly 2-ethyl hexanoic acid or various naphthenic acids are used as ligands, and combinations thereof. Transition metals typically include cobalt, zirconium, and manganese; and a routinely used in the printing industry as drying accelerators. A siccative additive is present from 0 to 3 percent of a complete formulation for application to a substrate. In certain inventive embodiments, the siccative additive, if present, is provided from 0.5 to 2 total weight percent.

In some inventive formulations, particularly well-suited for application from a tube having an opening, the formulation is adjusted to not only have storage stability of at least 1 month and in some instances more than 3 months without appreciable separation, but also to have a viscosity in the range of 3,000 to 12,000 centipoise. The tube selectively sealed with a cap for extruding the formulation as a bead. The bead typically having a width of 3.2±1 millimeters (mm). An inventive formulation is summarized in the following Table 1.

TABLE 1

Inventive surface marker formulation in typical and specific versions, with amount as total weight percent.

| Ingredient | Typical Amount (%) | Specific Amount (%) |
|---|---|---|
| Inorganic particulate | 22-41 | 33-41 |
| Linear aromatic polyester or copolymer | 16-37 | 20-35 |
| Colorant package | 0.2-20 | 0.5-8 |
| Thixotropic agent | 0-15 | 0.5-8 |
| Siccative additive | 0-3 | 0-2 |
| Solvent | remainder | remainder |

The formulation is readily supplied in a marking tube. The marking tube is typically formed of aluminum and includes an opening to define a volume for containing the formulation. To preclude the formulation drying prematurely on the opening, a cap is selectively removable to expose the opening from which the formulation is dispensed as a bead. In this way, a controlled bead width is easily applied to a surface.

The present invention is further illustrated with respect to the following non-limiting examples:

Example 1

Inorganic particulate that is a mixture of mica and titanium dioxide having a weight ratio of 1.6:1 and a particle number average, maximal linear extent of between 10 and 48 microns for both mica and titanium dioxide is dispersed to 31.35 total weight percent, along with a linear aromatic polyester resin having a Tg of 70° C. and a molecular weight of 60,000 that is amorphous is dissolved to 25.80 total weight percent in a solvent of methyl ethyl ketone (38.68 total weight percent) with 3.13 total weight percent hectorite clay and 1.04 total weight percent kaolin clay. The resulting formulation is packed into an aluminum tube and crimped using a conventional tube filling system and applied as a bead 3.2 millimeters (mm) in width and a thickness of 0.5 mm onto substrate panels of glass, mild steel, aluminum, ceramic, porcelain, acrylic, polyethylene, and polyamide without exhibiting sagging. The formulation dried in less than 60 seconds to the touch with the volatilization of the solvent.

Examples 2-6

The formulation of Example 1 is modified with inclusion of 3.53 total weight of DAYGLO® pink (Example 2, MC-11), or yellow (Example 3, MC-17), blue (Example 4, MC-19), orange (Example 5, MC-15), or green (Example 6, MC-18) fluorescent pigment along with 1 total weight percent of diacetone alcohol and 0.8 total weight percent of a fungicide and the concurrent proportional reduction in the other components of Example 1. The formulation of Examples 2-6 are applied to panels and tested per Example 1 with nearly identical results.

The invention claimed is:

1. A surface marker resin formulation comprising:
    a linear aromatic polyester or a co-polymer thereof;
    a solvent in which said linear aromatic polyester or a co-polymer thereof is dissolved or dispersed, said solvent exclusive of naphtha, said solvent is present from 20 to 40 total weight percent; and
    an inorganic particulate having an average maximal linear extent of between 10 and 130 microns in at least one of orthogonal axes (X-Y-Z), said inorganic particulate present from 22 to 41 total weight percent; and
    a thixotropic agent present in an amount sufficient to yield a viscosity of 3,000 to 12,000 centipoise for the formulation.

2. The formulation of claim 1 wherein said solvent is at least one of: methylene chloride, chloroform, 1,2-dichloroethane, tetrachloroethane, methylchloroform, 1,1,2-trichloroethane; $C_3$-$C_8$ ketones, cyclic $C_3$-$C_6$ ethers, ($C_1$-$C_4$)—O—($C_1$-$C_4$) ethers, ethylene glycol ethers, diethylene glycol ethers, or $C_2$-$C_{14}$ alkyl esters of $C_2$-$C_8$ carboxylic acids.

3. The formulation of claim 1 wherein said solvent is a majority by solvent weight percentage $C_3$-$C_8$ ketones.

4. The formulation of claim 3 wherein said solvent is a majority by solvent weight percentage methyl ethyl ketone.

5. The formulation of claim 1 wherein said inorganic particulate is mica, titanium dioxide, aluminum oxide, magnesium oxide, calcium carbonate, magnesium silicate, or a combination thereof.

6. The formulation of claim 1 wherein said inorganic particulate is a mixture of mica and titanium dioxide present in a weight ratio of 1.2-4:1.

7. The formulation of claim 6 wherein the average maximal linear extent of the mixture is between 10 and 48 microns.

8. The formulation of claim 1 further comprising a colorant package dissolved or dispersed in said solvent.

9. The formulation of claim 8 wherein said colorant package comprises a fluorescent pigment or dye.

10. The formulation of claim 1 further comprising at least one additive of: a siccative, an anti-skinning agent, and a wetting agent.

11. A marking tube comprising:
    a formulation of claim 1;
    a metal tube having an opening and defining a volume enclosing the formulation; and
    a cap selectively removable to expose the opening from which the formulation is dispensed as a bead.

12. A process of marking a surface comprising:
    bringing two articles into a pre-selected alignment to define a surface;
    applying the formulation of claim 1 to the surface as a continuous bead; and
    drying the formulation to a state of dry-to-touch in a time of less than 60 seconds to mark the surface.

13. The process of claim 12 wherein the two articles are torqued to define the surface.

14. The process of one of claim 12 wherein the two articles are part of a vehicle.

15. The process of claim 14 wherein the vehicle is an airplane.

16. The process of claim 12 wherein said applying of the formulation is from a tube.

17. The process of claim 12 wherein said applying of the formulation is as a bead having a width of 3.2±1 millimeters.

18. The process of claim 12 wherein said drying occurs in to full hardness in 24 hours under standard temperature and pressure.

* * * * *